(12) United States Patent
Curti et al.

(10) Patent No.: US 9,103,413 B2
(45) Date of Patent: Aug. 11, 2015

(54) EPICYCLIC GEARING

(71) Applicant: GE AVIO S.R.L., Rivalta di Torino (IT)

(72) Inventors: Edoardo Curti, Chieri (IT); Michele Gravina, Minervino Murge (IT); Giulio Zagato, Moncalieri (IT); Luca Ronchiato, Porte (IT); Elio Perona, Cafasse (IT); Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 14/356,129

(22) PCT Filed: Nov. 2, 2012

(86) PCT No.: PCT/IB2012/056123
§ 371 (c)(1),
(2) Date: May 2, 2014

(87) PCT Pub. No.: WO2013/065024
PCT Pub. Date: May 10, 2013

(65) Prior Publication Data
US 2014/0309078 A1    Oct. 16, 2014

(30) Foreign Application Priority Data
Nov. 3, 2011    (IT) .............................. TO2011A1007

(51) Int. Cl.
*F16H 57/08* (2006.01)
*F16H 1/28* (2006.01)
*F02C 7/36* (2006.01)

(52) U.S. Cl.
CPC .. *F16H 1/28* (2013.01); *F02C 7/36* (2013.01); *F16H 1/2827* (2013.01); *F05D 2260/40311* (2013.01); *F16H 2001/289* (2013.01); *Y02T 50/671* (2013.01)

(58) Field of Classification Search
CPC .... F16H 1/2827; F16H 1/28; F16H 2001/289
USPC ......................................................... 475/331
See application file for complete search history.

(56) References Cited

U.S. PATENT DOCUMENTS

| 2,144,607 A | 1/1939 | Chilton |
| 3,459,072 A | 8/1969 | Shannon |
| 5,466,198 A * | 11/1995 | McKibbin et al. ............ 475/346 |
| 6,223,616 B1 * | 5/2001 | Sheridan ......................... 74/468 |

(Continued)

FOREIGN PATENT DOCUMENTS

| EP | 2 339 208 A1 | 6/2011 |
| WO | 94/29614 A1 | 12/1994 |
| WO | 02/14690 A1 | 2/2002 |

*Primary Examiner* — Derek D Knight
(74) *Attorney, Agent, or Firm* — Maschoff Brennan

(57) ABSTRACT

An epicyclic gearing has a plurality of planet gears arranged about a transmission axis so as to form two arrays symmetrical with respect to a plane orthogonal to the transmission axis; the gearing has a body which, on one side, is adapted to be connected to a rotating member and, on the other side, is coupled to a ring; the ring has a plurality of relatively thin plate sectors and a plurality of pins, which extend in cantilever fashion and in opposite directions from the plate sectors and each support a respective planet gear; coupling between the aforesaid body and the ring defines at least one degree of freedom in rotation about a radial axis to allow a relative movement under load between the two components.

13 Claims, 7 Drawing Sheets

(56) References Cited

U.S. PATENT DOCUMENTS

| | | |
|---|---|---|
| 6,409,414 B1 * | 6/2002 | Altamura et al. ............... 74/410 |
| 7,011,598 B2 | 3/2006 | Flamang et al. |
| 7,011,599 B2 * | 3/2006 | Becquerelle et al. ......... 475/331 |
| 7,704,178 B2 * | 4/2010 | Sheridan et al. ............. 475/159 |
| 8,597,154 B2 | 12/2013 | Polacco et al. |
| 8,667,688 B2 * | 3/2014 | McCune et al. ............. 29/893.1 |
| 8,727,935 B2 * | 5/2014 | Coffin ........................... 475/346 |
| 8,777,793 B2 * | 7/2014 | Sheridan ....................... 475/160 |
| 8,900,083 B2 * | 12/2014 | Sheridan ....................... 475/160 |

* cited by examiner

EPICYCLIC GEARING

TECHNICAL FIELD

The present invention relates to an epicyclic gearing.

BACKGROUND ART

As is known, epicyclic gearings are capable of transmitting motion between coaxial shafts, rotating at different speeds, and are very efficient in performing this function with limited weight and overall dimensions.

In some applications, reducing the overall outer dimension of the epicyclic gearing in radial direction, with respect to the axis of the two aforesaid shafts, is particularly important. For example, in the aeronautical propulsion field, in particular in the new engine architectures being studied to reduce consumption and pollution (such as "Geared Turbofan" and "Open Rotor" architectures), epicyclic gearings are used to transmit all of the power generated by the turbomachine to the propulsion system. Unlike the case, for example, of turbofan engines, in these applications the epicyclic gearing is integrated with the turbomachine, and therefore the diametral envelope thereof could influence the geometries of the channels for the passage of air flow or exhaust gases, and therefore penalise the output of the same turbomachine.

One of the essential elements in determining the dimensions of the epicyclic gearing in radial direction is constituted by the bearings of the planet gears. In particular, in the field of aeronautical engines, attention has recently been directed towards the replacement of rolling bearings with plain bearings or bushings, to couple the planet gears to the planet gear carrier or gear train carrier structure.

Prior art configurations in the field of aeronautical engines not only use planet gears supported by plain bearings, but also planet gears with double helical toothings. Solutions of this type have some critical points:
  double helical toothings cannot be separated in their meshing, and therefore the gearing with its box must be mounted in the motor as a single component;
  to mount the gearbox it is necessary to produce splined couplings with very small diameters which, as such, are subject to wear;
  the architecture of the gear train carrier structure is relatively complex to minimise misalignments between the planet gears under load and sensitivity to construction errors;
  plain bearings have a very low tolerance to contamination and can give rise to catastrophic and almost instant failures;
  an auxiliary supply of lubricant is required to prevent damage to the plain bearings if the main lubrication system is not operating (i.e. while standing on the runway in the presence of wind or in case of failure), with consequent increase in weight and complexity of the engine.

Other solutions maintain bearings of rolling type, but in order to reduce the dimensions of the planet gears they use two planet gear arrays, instead of one, arranged on opposite sides of an annular plate. In particular, the planet gears are mounted by means of the aforesaid rolling bearings on respective pins, which extend in cantilever fashion with respect to the plate and parallel to the axis of the gearing. A solution of this type is known, for example, from EP2339208A1, which corresponds to the preamble of claim 1.

The rotational torque is transmitted between the plate and a rotating transmission member by means of connection elements which are substantially parallel to the axis of the gearing, are generally called "tenons", and are fixed with respect to the plate.

An example of this type of embodiment is visible in WO2002/079644.

In ideal conditions, this system balances the bending moments between the two arrays of planet gears and allows only a shear load to be relieved on the plate. However, in practice, the rigid connection between the tenons and the plate tends to make the plate bend during operation.

This bending has the effect of causing the axes of the pins that support the planet gears to bend, which leads to undesirable unbalancing between the loads on the planet gears between the two arrays, which gives rise to undesirable reaction stress in the connection area between the pins and the plate.

To overcome the effects caused by bending of the plate, its thickness could be increased. However, it is preferable not to exceed certain limits of thickness, as an axial dimension of the plate that is too large would make operation thereof particularly susceptible to construction errors (in particular to positioning errors of the planet gears, which again translate into significant overloads on the same planet gears).

The most widely used solution to reduce unbalance of the loads on the planet gears is the use of a configuration called "flex pin", in which the pins supporting the planet gears have the ability to bend locally to automatically offset the effects of bending of the plate.

Unbalance of the loads on the planet gears can also be caused by radial deformations of the ring gear with which the planet gears mesh. In particular, the ring gear is constituted by a single part or by two half-rings fixed to each other and comprises an outer flange, one side of which is fixed to a transmission member for torque output.

Extraction of the torque on one side generates a radial deformation which is asymmetric with respect to the centre-line plane. This deformation asymmetry leads to torque being transmitted to a greater extent on one, array of planet gears with respect to the other and therefore to one array of planet gears being subject to greater stress. This problem is normally solved by mounting an additional fin on the outer flange, on the opposite side with respect to that of the transmission member for motion output. However, this fin causes an increase in the number of components of the gearing and in the assembly times, and not always manages to optimise balancing of the torque transfer paths.

DISCLOSURE OF INVENTION

The object of the present invention is to provide an epicyclic gearing that enables the problems indicated above to be solved simply and inexpensively, through solutions that can be used in addition or in alternative to the "flex pin" configuration, and so as to offset construction errors due to machining tolerances and/or obtain a significant reduction in weight.

BRIEF DESCRIPTION OF THE DRAWINGS

The invention will now be described with reference to the accompanying drawings, which illustrate a non-limiting example of embodiment thereof, wherein.

BEST MODE FOR CARRYING OUT THE INVENTION

Figure 1:
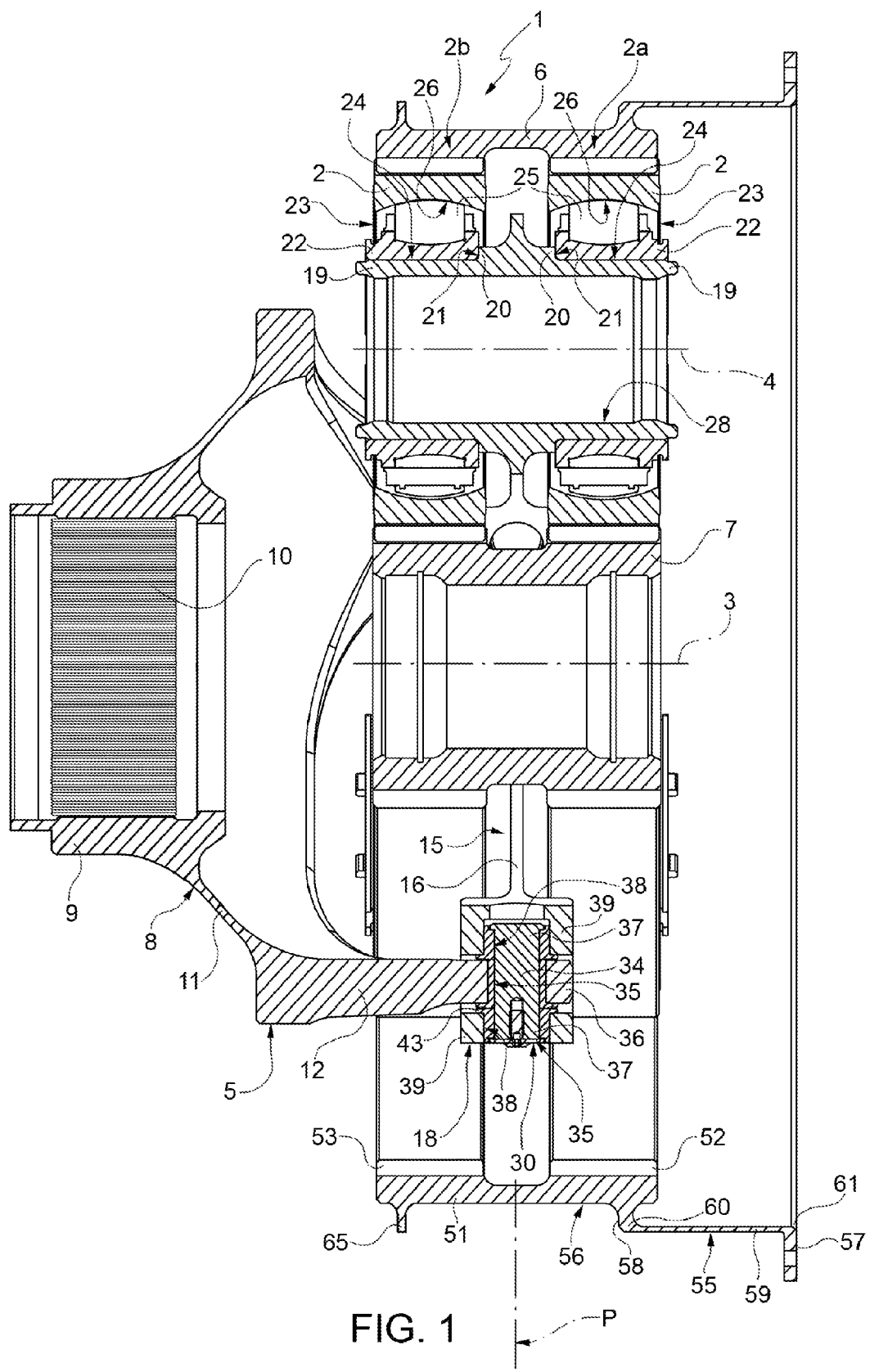
FIG. 1 illustrates, in cross section, a preferred embodiment of the epicyclic gearing according to the present invention.

With reference to FIG. 1, the numeral 1 indicates, as a whole, an epicyclic gearing comprising a plurality of planet gears 2, which are arranged about an axis 3, rotate about respective axes 4, parallel and eccentric with respect to the axis 3, are supported by a planet gear carrier or gear train carrier structure 5, and mesh, on the outside, with a ring gear 6 and, on the inside, with a sun gear 7. Preferably, the axes 4 are angularly equidistant with respect to one another about the axis 3.

Figure 3:
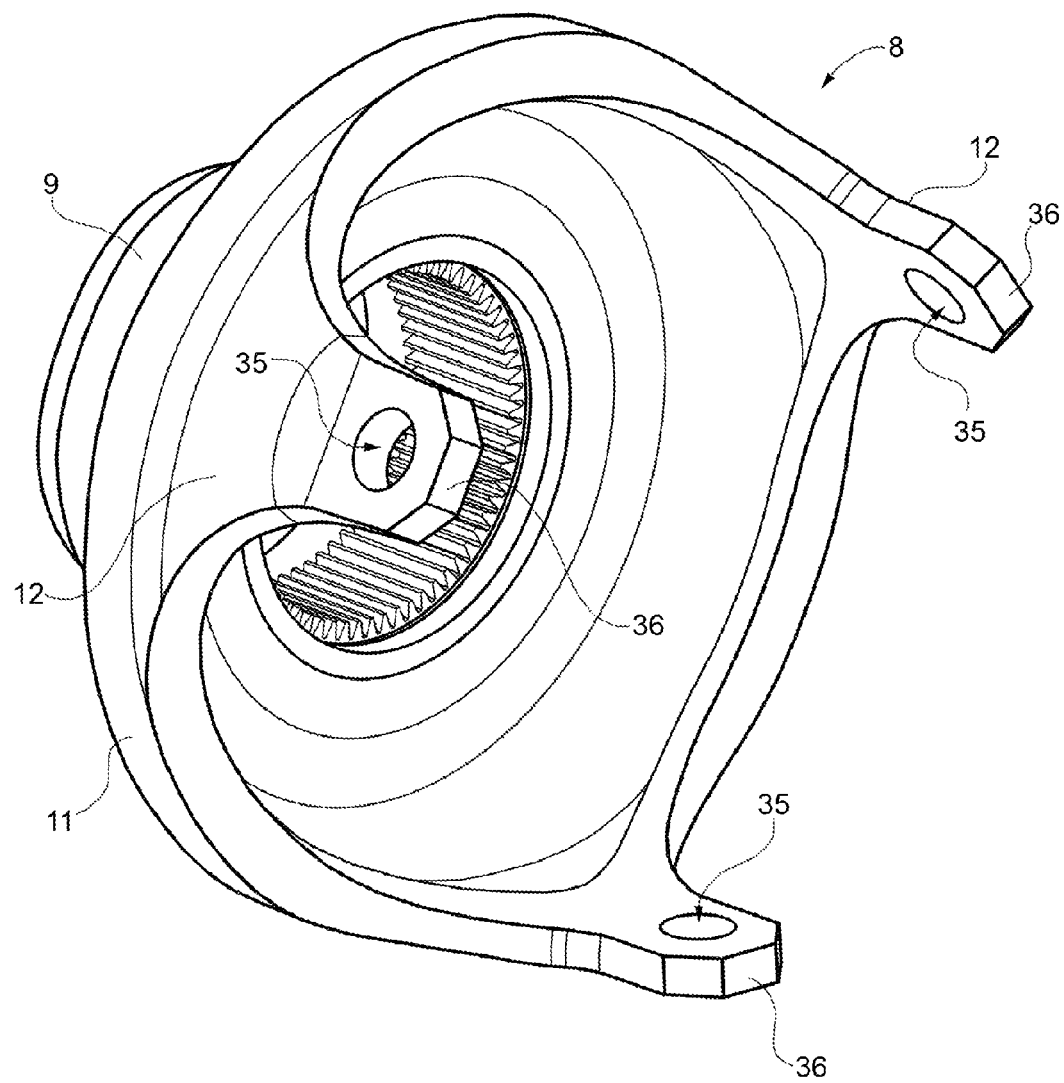
FIGS. 3 and 4 are perspective views showing, respectively, two components of a planet gear carrier structure of the epicyclic gearing of FIG. 1.

With reference to FIGS. 1 and 3, the structure 5 comprises a fastening body 8, which terminates axially with a portion 9 defining a coupling to connect the gearing 1 in an angularly fixed manner to a rotating member, not illustrated, for example to a motion output shaft. In the particular example illustrated, the portion 9 is tubular, to be fitted around this shaft, and internally defines a splined coupling 10. In alternative to the splined coupling, the fastening body 8 can have a flanged coupling or other type of coupling.

The fastening body 8 also comprises a bell-shaped intermediate portion 11, and ends with a plurality of finger portions 12, which are connected to the portion 11, extend in cantilever fashion in directions substantially parallel to the axis 3 and are arranged in intermediate angular positions between the axes 4.

Figure 4:
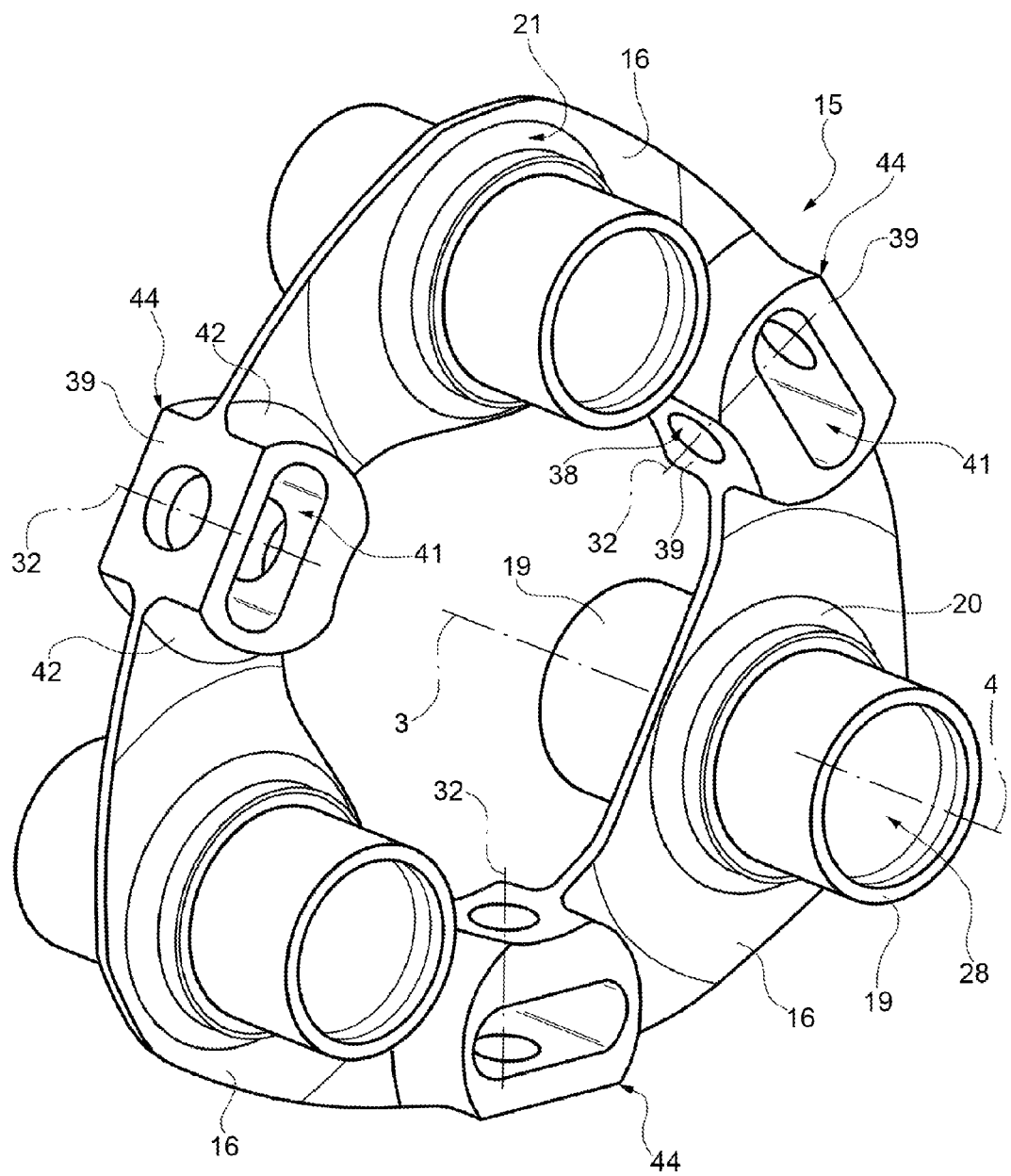

With reference to FIGS. 1 and 4, the structure 5 also comprises a single ring 15, which is coaxial with the fastening body 8 along the axis 3 and has a plurality of plate sectors 16. The plate sectors 16 extend in a plane P orthogonal to the axis 3, and are defined by thin walls, i.e. with a thickness of less than 10 mm (typically a thickness of 5-7 mm) for a size of 15 MW with two arrays of three planet gears each. The plate sectors 16 are intercalated angularly to joint devices 18, which couple the ring 15 to the finger portions 12, as will be better explained below.

The ring 15 comprises, for each planet gear 2, a respective hub or pin 19, which is preferably made in one piece with a corresponding plate sector 16, extends in cantilever fashion along the axis 4 and is connected to this plate sector 16 by means of a projection or step 20. The step 20 defines an axial shoulder 21 against which the inner ring 22 of a rolling bearing 23 rests. As shown in FIG. 1, the ring 22 is coupled to the outer cylindrical surface 24 of the pin 19, while the bearing 23 is preferably without the outer ring: in other words, the outer rolling track of the of the rolling bodies 25 is defined by an inner surface 26 of the planet gear 2. Preferably, the rolling bodies 25 are barrel rollers, and therefore the rolling tracks are spherical and thus able to decouple the toothing of the planet gear from the deformations under load of the pins 19.

The pins 19 are arranged on both faces of the plate sectors 16 and are opposed along the axes 4 so as to support two arrays 2a, 2b of planet gears, which are symmetric with respect to the plane P on which the plate sectors 16 lie. In the example illustrated, each of the two arrays 2a, 2b comprises three planet gears 2, but the solution proposed is compatible with any number of planet gears.

Again with reference to FIG. 1, preferably each pair of coaxial pins 19 defines an axial passage 28 engaged by connection devices (not illustrated), which block the inner rings 22 of the bearings 23 respectively against the shoulders 21.

Preferably, the toothings of the planet gears 2 are cylindrical with straight teeth.

Figure 5:
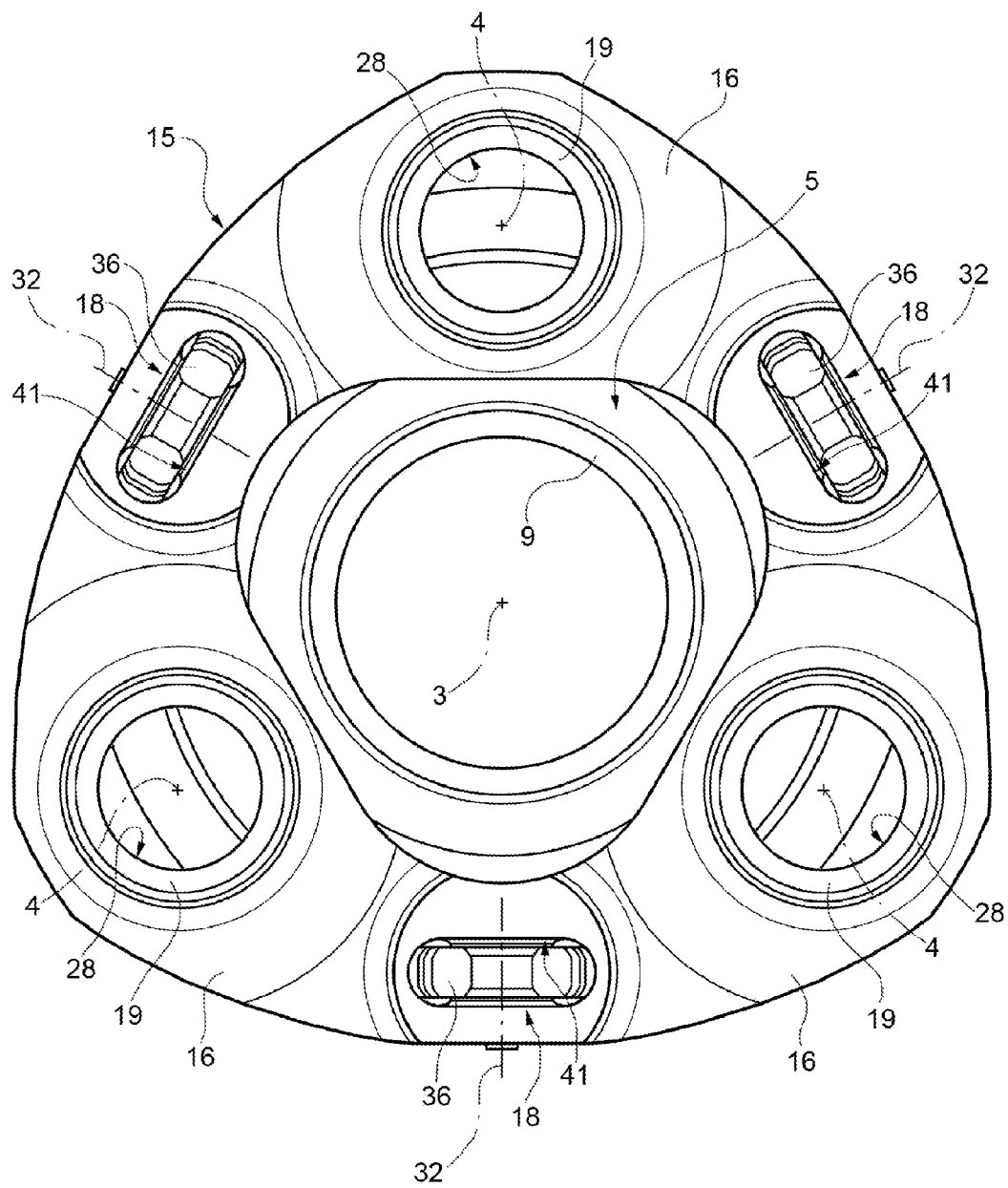
FIG. 5 is a front view of the planet gear carrier structure of FIG. 1.

Returning now to the joint devices 18 shown in FIGS. 1 and 5, each of these transfers the shearing actions (tangential forces) and therefore the torque between the ring 15 and the fastening body 8, but defines at least one degree of freedom which enables a relative movement under load between the ring 15 and the fastening body 8, so as to prevent bending moments by the fastening body 8 to the ring 15 and therefore prevent bending on the plate sectors 16.

Each joint device 18 is arranged angularly between two adjacent axes 4. Therefore, the number of joint devices 18 is equal to the number of planet gears 2 present in each array 2a, 2b. Each joint device 18 enables a connection or relative rotation between the finger portion 12 and the ring 15 about an axis 32 which is radial with respect to the axis 3.

In the example shown, each joint device 18 is defined by a respective cylindrical hinge 30, comprising a hinge pin 33, which extends along the axis 32 and has an intermediate portion 32 engaging a hole 35 made in the end 36 of the finger portion 12.

The joint devices 18 comprise respective coupling or hinging portions 44, which are part of the ring 15 and are alternated with the plate sectors 16 in circumferential direction about the axis 3, i.e. they separate the plate sectors 16 from one another. The portions 44 are substantially rigid to bending, as they have a greater thickness than the plate sectors 16 in direction parallel to the axis 3 (FIG. 4).

The portions 44 are preferably made in one piece with the plate sectors 16 and each comprises a respective pair of walls 39 having respective holes 38. Each hinge pin 33 ends with two opposite portions 37, which respectively engage the holes 38.

The walls 39 are preferably arranged as an extension of the inner edge and of the outer edge of the plate sectors 16 and are substantially orthogonal to the axis 32.

The portions 44 have respective seats 41, which are defined radially by the walls 39 and are each engaged by a respective end 36.

Each portion 44 also comprises a respective pair of walls 42, which define in tangential direction the seat 41 (FIG. 4) and are spaced from the corresponding ends 36 so as to leave the finger portion 12 a certain clearance in tangential direction and therefore freedom to rotate about the axis 32.

Preferably, each joint device 18 also comprises bushings and/or spacers 43 (FIG. 1) which are made of a material with low friction coefficient, couple the hinge pin 33 to the walls 39 and/or to the end 36 of the finger portion 12, and perform the function of protecting the connection or joint from wear and of also being a sacrificial safety element in case of failure.

Alternatively to the cylindrical hinge 30, each joint device 18 is defined by a respective ball joint.

Figure 2:
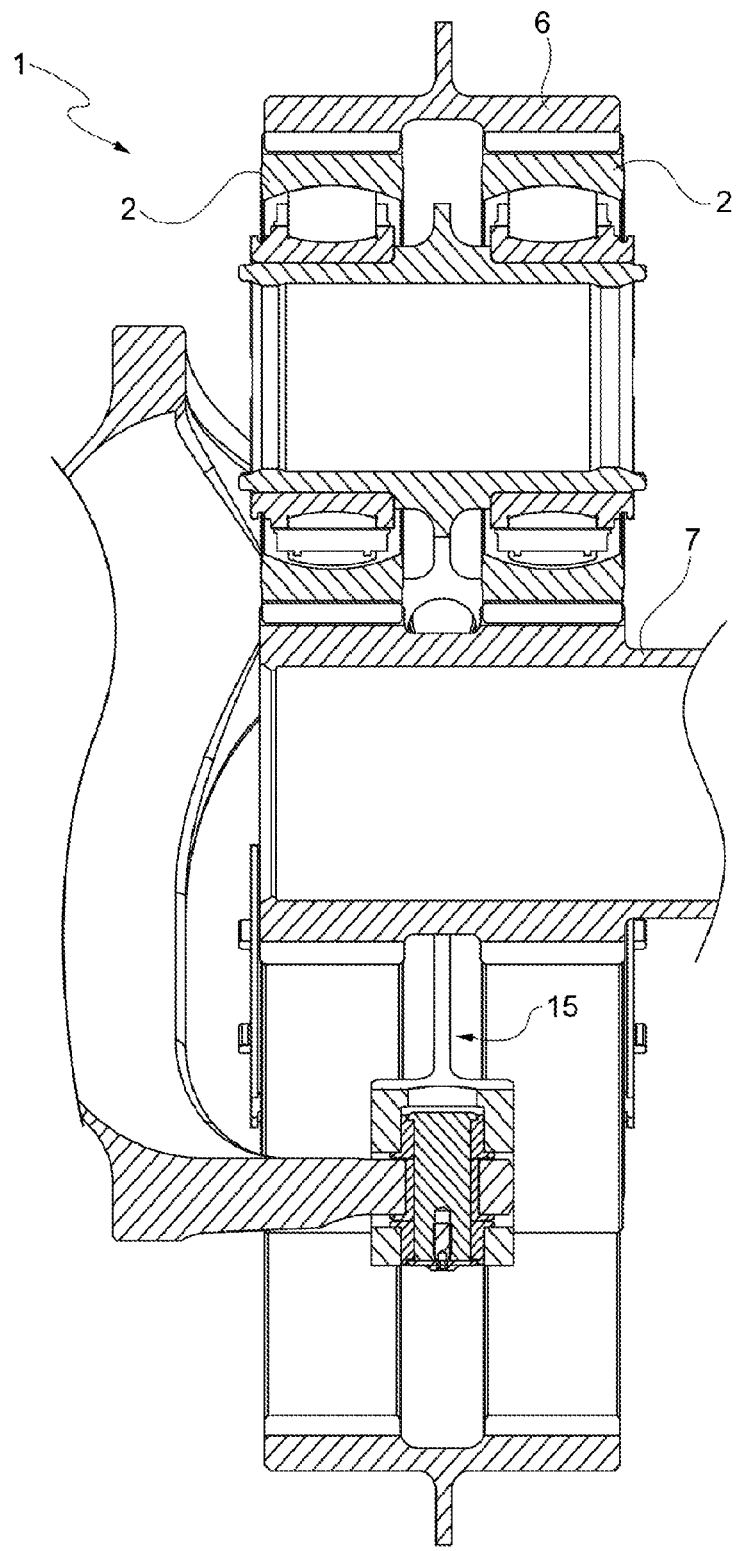
FIG. 2 is analogous to FIG. 1 and shows, with parts removed for clarity, a variant of the epicyclic gearing of FIG. 1.

FIG. 2 shows a variant in which the configuration of the sun gear 7 and of the ring gear 6 are different, for different couplings and uses of the gearing 1.

Figure 6:
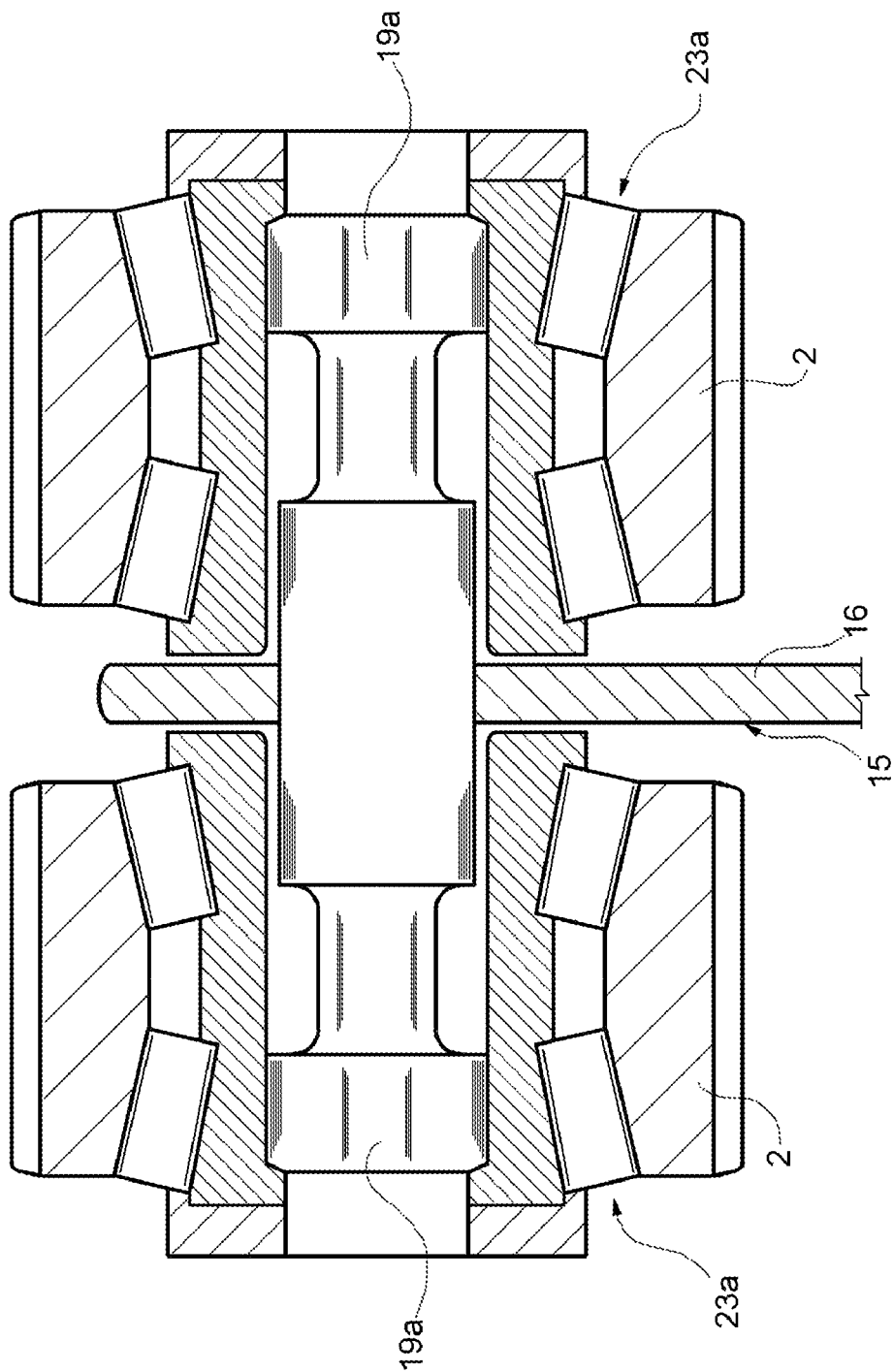
FIG. 6 shows, in cross section, a detail relating to a further variant of the epicyclic gearing of FIG. 1.

Moreover, in alternative to the pins 19, which are substantially rigid and require the use of bearings with barrel-rollers to offset their deformation under load, a variant such as that shown in FIG. 6 could be provided, which uses in the pins 19a solutions with local flexibility, in particular a configuration of the "flex pin" type to support the planet gears 2. This configuration, which is more complex with respect to those illustrated above, enables the use of bearings 23a, which autonomously are unable to offset misalignments between the inner and outer rolling seats of the rolling bodies and therefore with rolling bodies different from the barrel-rollers. In this case, the planet gears 2 could have toothings that are not straight.

Returning to FIG. 1, the ring gear 6 comprises a tubular element 51 which carries, on the inner surface thereof, two toothings 52,53, which mesh with the toothings of the planet gears 2 of the arrays 2a and, respectively, 2b. Preferably, the tubular element 51 is defined by a single piece. Alternatively, it could be constituted by two pieces, on which the toothings 52, 53 are respectively produced.

The ring gear 6 also comprises a fastening element 55, which is made in once piece with a part of the tubular element 51, and extends in cantilever fashion from an outer cylindrical surface 56 of the tubular element 51. The fastening element 55 ends with a fastening flange 57, which extends orthogonally to the axis 5, is connected to a transmission member (not illustrated) for motion output and is preferably provided with holes for respective connection bolts.

The fastening element 55 comprises a connecting flange 58, which extends in cantilever fashion from the surface 56 in a position spaced from the plane P. The fastening element 55 also comprises a tubular portion 59, which is coaxial to the tubular element 51 and joins the outer edge 60 of the flange 58 to an edge 61 of the flange 57. Advantageously, the tubular portion 59 has a greater deformability than that of the flanges 57, 58 and of the tubular element 51, so as to allow a certain degree of freedom of relative movement between the transmission member for motion output and the tubular element 51.

The ring gear 6 comprises at least one rib or projection 65, which is made in one piece with a part of the tubular element 51, and extends radially outward from the surface 56 in addition to the fastening element 55. The rib 65 is arranged on the opposite half of the tubular element 51 with respect to that of the fastening element 55.

Preferably, the projection 65 extends with continuity along a circumference about the axis 3.

The position in direction parallel to the axis 3, the radial dimension, the axial dimension and the number of ribs 65 on the surface 56 are determined in the design phase so as to locally stiffen the tubular element 51 and to ensure that the radial deformation of the tubular element 51 at the two toothings 52, 53 is symmetrical with respect to the plane P. In general, the radial dimension with respect to the surface 56 is equal between all the ribs 65.

The rib, or ribs, 65 are arranged in asymmetric positions with respect to the plane P so as to add rigidity which offsets the deformation unbalance that would be caused by extraction of the torque implemented on one side of the flange 58. The ribs 65 thus restore an identical torque path between the arrays 2a, 2b. In fact, without the ribs 65 there would be a preferential torque path, i.e. where the greatest rigidity is present, in the half in which the fastening element 55 is fixed, resulting in greater stress of the array 2a with respect to the array 2b.

Figure 7:
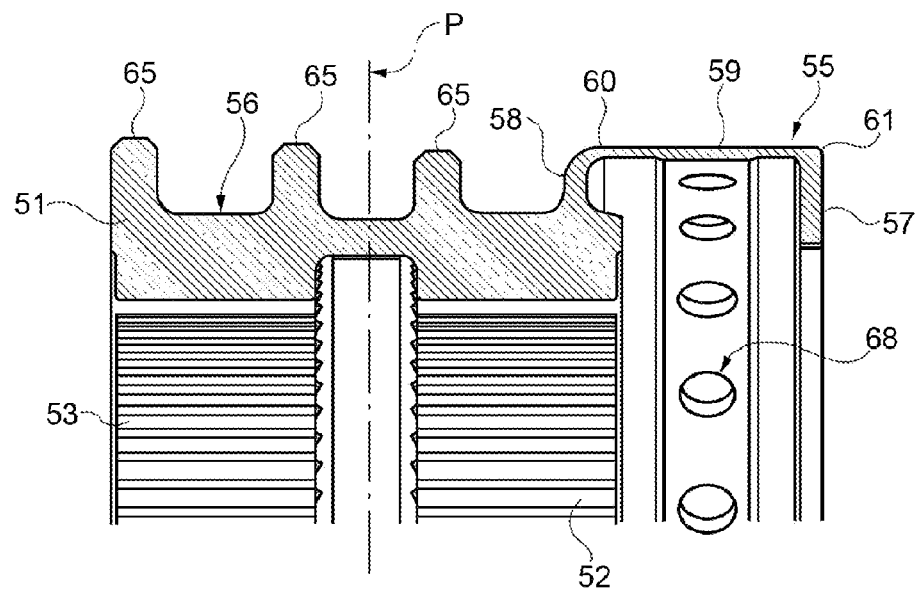
FIGS. 7 and 8 show respective variants of a ring gear of the epicyclic gearing of FIG. 1.

The variant of FIG. 7 has the following differences with respect to the configuration of the ring gear 6 of FIG. 1:
- the flange 57 extends radially inward from the end of the tubular portion 59, instead of outward;
- the number of ribs 65 added to the fastening element 55 is three, instead of one; one of the three ribs 65 is arranged on the same side of the flange 58 with respect to the plane P; the other two ribs 65 are arranged on the opposite side; the greater number and the position of the ribs 65 tends to make the radial deformation of the tubular element 51 in a direction parallel to the axis 3 more uniform;
- the tubular portion 59 has a plurality of holes 68 for lubricant drainage.

Naturally, the differences listed above can be applied independently from one another.

Figure 8:
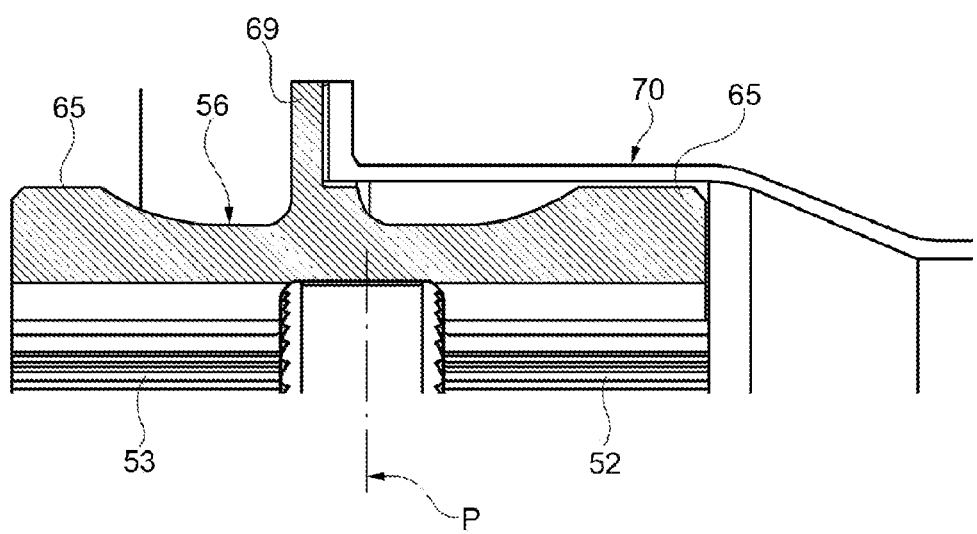

The variant of FIG. 8 has the following differences with respect to the configuration of the ring gear 6 of FIG. 1:
- the fastening element 55 is defined by a fastening flange 69, which extends radially outward from the surface 56, so that this variant has no tubular portion (substantially as in FIG. 2); the transmission member for motion output is indicated with the reference number 70, is resting on an axial side of the flange 69 and is fixed to the flange 69, for example using bolts.
- the flange 69 is axially moved away from the plane P, in opposite direction to the position of the transmission member 70;
- two ribs 65 there are preferably provided, arranged on opposite sides of the plane P; in particular, the two ribs 65 are arranged at the axial ends of the tubular element 51 and have different axial dimensions from one another;
- preferably, the axial dimension of each of the two ribs increases moving radially toward the surface 56: for example, the ribs 65 have respective concave lateral surfaces tangent to the surface 56.

From the above, the advantages of the configuration of the gearing 1 are evident.

The degree of freedom defined by a connection between the planet gear carrier ring 15 and the fastening body 8 prevents the transmission of bending to the ring 15. In other words, this connection ensures uniform tensile/compressive stress on the ring 15 and eliminates bending, which would instead be produced by rigid connections.

Therefore, if the gearing 1 is compared with solutions already having a planet gear carrier plate, known in industrial applications and for wind turbines, there is no load unbalance between the two arrays 2a, 2b of planet gears, as the absence of bending in the ring 15 implies zero relative displacement in tangential direction between two coaxial planet gears belonging to the different arrays 2a, 2b.

The fact of eliminating the bending actions coming from the fastening body 8 also allows the ring 15, in particular the plate sectors 16 that support the pins 19, to be produced with very limited thickness.

This means a ring 15 is obtained with very low flexural rigidity, in particular in the areas in which the pins 19 are connected. In particular, the reduction in flexural rigidity is concentrated in the sectors 16, which are separated from one another by the portions 44, while the portions 44 remain substantially rigid, in particular due to their dimensions. In greater detail, the reduction of flexural rigidity is concentrated, for each sector 16, in two areas which are arranged on opposite sides of the respective pin 19, in circumferential direction, as the outer diameter of the step 20 is substantially the same as the radial dimension of the plate sector 16 (FIG. 4).

The cross sections of each of these areas are rectangular, considering section planes perpendicular to a line which, on the plane P, joins the centre of the connection, defined by the hinge pin 33, with the centre of the pins 19, i.e. with the axis 4. The thickness s in axial direction is small, i.e. the cross section where the moment of inertia I is minimum (where $I=b^3*h/12$) has a thickness s and a width h which comply with the following geometric ratio: $h>5*s$.

As flexural rigidity is the determining element in quantification of overloads on the planet gears 2 in the presence of manufacturing errors, a planet gear carrier ring 15 with very thin plate sectors 16 intrinsically ensures lower sensitivity and therefore high tolerance to manufacturing errors, without having to necessarily adopt "flex-pin" type solutions for the pins 19.

In fact, machining tolerances and assembly errors cause a deviation from optimal operating conditions, and this deviation, in turn, causes unbalance between the torque paths between the arrays 2a, 2b. In case of errors that tend to cause a tangential displacement of the planet gears 2, i.e. a rotation about a bending axis orthogonal to the axis 4, the plate sectors 16 automatically deform, due to their low flexural rigidity, and therefore absorb these errors and restore an acceptable operating condition.

In these operating conditions, a moment M occurs in the joining point between the pins 19 and the plate sectors 16, and therefore a variation of the nominal load transmitted by the pins 19. To limit the overload with respect to the nominal load, the moment M must be as small as possible. The greater the flexibility of the ring 15 (i.e. low flexural rigidity) is, the smaller the moment M will be.

In particular, by setting a maximum admissible angle θ for misalignment of the axes of the pins 19 with respect to ideal directions parallel to the axis 3, and having determined, in the operating conditions, a total load F on the pins 19 (inclusive of any overload with respect to the nominal load), the flexural rigidity K of the ring 15 must satisfy:

$$K < F*b/\theta$$

where b is the arm or distance between the centre of the plate sectors 16 (i.e. the plane P) and the centre of the supporting area of the bearings 23 and/or of the pins 19, in direction parallel to the axis 3.

In the present case, by setting a very low flexural rigidity K (for example reducing the thickness s of the plate sectors 16), the operation and reliability of the gearing 1 are not compromised, but a high tolerance to manufacturing errors is guaranteed: in particular, it is possible to maintain the load sharing factor between the planet gears 2 at a value in the order of 5% (applications for wind turbines without taking any measures instead have a load sharing factor of over 20%). Therefore, the solution claimed achieves a result with radically enhanced performance with respect to prior art solutions.

Moreover, the gearing has a limited weight, due to the fact that the toothings of the planet gears 2 do not require to withstand overloads, and due to the limited thickness s of the ring 15 at the plate sectors 16.

With respect to prior art solutions for aeronautical applications, which normally use plain bearings, bearings 23 of rolling type are intrinsically more resistant to contamination and have failure modes that are slower and, in the majority of cases, are recognisable by the common systems installed in the aeronautical engine. Therefore, advantages are achieved in terms of safety and the absence of superfluous lubricant supply systems. The fact of eliminating the outer ring of the bearings 23 in any case offers a solution that is compact in radial direction.

Moreover, the number of parts is relatively low, and assembly of the gearing 1 is facilitated through the use of gears with straight teeth.

The configuration of the ring gear 6 also enables balancing of the load transfer paths between the two arrays 2a, 2b, regardless of the configuration of the ring 15.

In fact, the deformation in radial direction of the tubular element 51 can be made substantially symmetrical with respect to the plane P between the two toothings 52, 53 by locally stiffening the outside of the ring gear 6 by means of the ribs 65, which can be designed in different ways for the various applications as a function of the operating conditions, without requiring to mount additional components to the fastening element 55. The asymmetry of the fastening position of the flange 69 on the surface 56 also enables the rigidity of the ring gear 6 to be optimised, with respect to the solution visible in FIG. 2.

From the above it is evident how modifications or variants can be made to the gearing 1 without departing from the scope of protection as defined by the appended claims.

Each bearing 23 can have a single array of rollers (as in FIG. 1), or a double array of rollers (as in FIG. 6).

The fastening body 8 could be configured so as to couple with shafts of larger diameter, and/or have coupling systems of different type to those illustrated. Moreover, the fastening body 8 could be coupled to a rotating member for motion input and not to a motion output shaft.

The asymmetric configuration of the ring gear 6 could be applied to solutions with two arrays of planet gears where the planet gears 2 and/or the ring 15 have a different configuration and/or the ring 15 is connected to the fastening body 8 in a manner different from that described and illustrated by way of example; and/or where helical gears are provided in placed of straight tooth gears.

The invention claimed is:

1. An epicyclic gearing comprising:
    a plurality of planet gears arranged about a transmission axis and so as to form two arrays, which are symmetrical with respect to a centreline plane orthogonal to said transmission axis;
    a fastening body comprising coupling means to connect said epicyclic gearing to a rotating member;
    a ring coaxial to said fastening body along said transmission axis and comprising a plurality of plate sectors lying on said centreline plane and each supporting a respective pair of pins, which extend in cantilever fashion in opposite directions with respect to the plate sector and each support a respective planet gear;
    connection means which couple said fastening body to said ring;
    wherein:
    said fastening body ends with a plurality of finger portions, which are substantially parallel to said transmission axis;
    said connection means are defined by a plurality of joint devices, each conferring a degree of freedom in rotation about a radial axis, so as to allow a relative movement under load between said ring and said fastening body; the joint devices comprising respective hinging portions, which are part of said ring and are alternated with said plate sectors in circumferential direction about said transmission axis; said hinging portions having respective seats engaged by ends of said finger portions;
    said plate sectors have an axial thickness that is smaller than that of said hinging portions in direction parallel to said transmission axis.

2. The epicyclic gearing according to claim 1, wherein, intercepting said plate sectors with section planes perpendicular to a line that joins, on said centreline plane, the centre of said joint device with the centre of an adjacent pair of pins, the cross section where the moment of inertia is minimum has a width that is greater than five times the axial thickness.

3. The epicyclic gearing according to claim 1, wherein said ring is made in one piece.

4. The epicyclic gearing according to claim 1, wherein said axial thickness is dimensioned in such a way that said ring has a flexural rigidity of less than $(F*b/\theta)$, where:
  F=total load F on said pins;
  b=arm parallel to said transmission axis between said centreline plane and the centre of the supporting area of said pins;
  θ=maximum admissible angle for misalignment of the axes of said pins with respect to directions parallel to said transmission axis.

5. The epicyclic gearing according to claim 1, wherein said hinging portions comprise respective pairs of walls, which radially delimit said seats, are substantially orthogonal to said radial axes and are arranged as an extension of the inner edge and of the outer edge of said plate sectors.

6. The epicyclic gearing according to claim 1, wherein each joint device is defined by a cylindrical hinge.

7. The epicyclic gearing according to claim 1, wherein each joint device is defined by a ball joint.

8. The epicyclic gearing according to claim 1, wherein said seats have, in tangential direction, a dimension such as to allow a rotation freedom about the respective radial axes for said finger portions.

9. The epicyclic gearing according to claim 1, wherein said planet gears are coupled to respective said pins by means of rolling bearings.

10. The epicyclic gearing according to claim 9, wherein said rolling bearings comprise rolling bodies different from barrel-rollers and are supported by hubs in flex-pin configuration.

11. A ring gear for an epicyclic gearing, comprising:
  a tubular element defined by a first and second half having respective inner toothings, which are arranged in symmetric positions with respect to a centreline plane orthogonal to the transmission axis of the ring gear and are adapted to mesh, in use, with respective arrays of planet gears;
  a fastening element, which is made in one piece with said first half, extends in cantilever fashion from an outer cylindrical surface of said first half, and ends with a fastening flange which extends orthogonally to said transmission axis;
  one rib, which extends radially outwards from the outer cylindrical surface of said first half;
  two ribs, which extend radially outwards from an outer cylindrical surface of said second half.

12. The ring gear according to claim 11, wherein said ribs are continuous in circumferential direction.

13. The ring gear according to claim 11, wherein said fastening element comprises a tubular portion coaxial to said tubular element and having a greater deformability than that of said fastening flange and than that of said tubular element.

* * * * *